Dec. 1, 1959    A. BRENNAN    2,914,873
ADHESIVE DEVICES
Filed Jan. 25, 1957
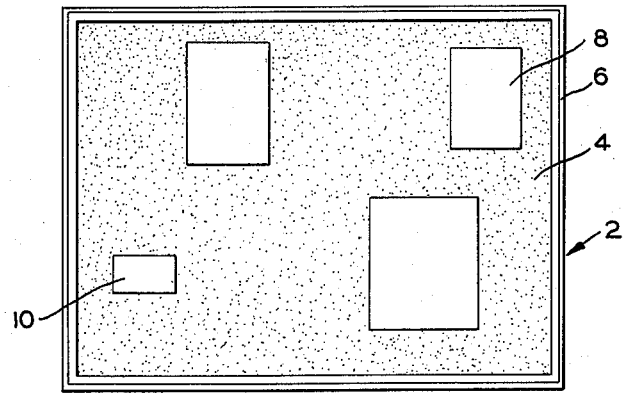
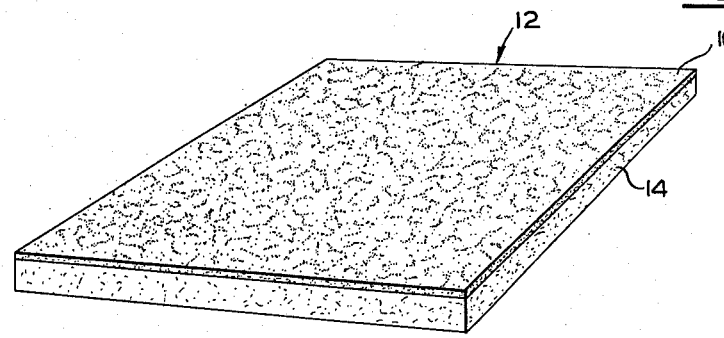
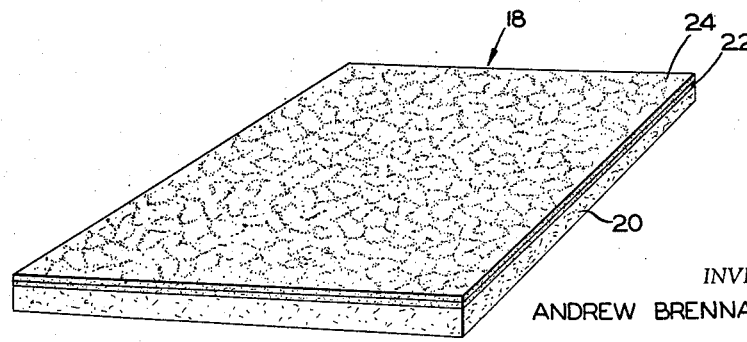
INVENTOR
ANDREW BRENNAN
BY *Kenon and Palmer*
ATTORNEYS

United States Patent Office 2,914,873
Patented Dec. 1, 1959

2,914,873

ADHESIVE DEVICES

Andrew Brennan, Philadelphia, Pa.

Application January 25, 1957, Serial No. 636,431

3 Claims. (Cl. 40—125)

This invention relates to adhesive devices and processes for making them. More particularly, it is concerned with adhesive devices, especially those having a sheet-like form, which have a pressure-sensitive adhesive surface thereon, to which paper or other flat articles may be mounted by simply pressing the article against the adhesive surface, and from which the article, once adhered, may be removed without damage by simply pulling the article from the adhesive surface, and to new methods for the preparation of such adhesive devices.

FIELD OF INVENTION

Many devices and schemes have been devised for adhering paper and other flat articles to various surfaces, such as the mounting of cards or papers upon bulletin boards, the fastening of indicia upon advertising display cards or signs, or the mounting of cut-off figures or the like by children on game boards or educational panels. For example, thumb tacks and similar mechanical fastening devices are extensively used for fastening papers and the like to bulletin boards. Similarly, the use of glue or other solvent activated adhesives for applying sheet-like articles to various surfaces is well known. However, thumb tacks and comparable mechanical fastening devices not only can cause damage to the mounted article, but they are often troublesome or inconvenient to use. Similarly, the use of glues or similar adhesives generally results in destruction or damage to the mounted article when the article is removed from the board or the surface upon which it has been supported.

The disadvantages connected with the use of thumb tacks or related mechanical fastening devices have been recognized for a long time, and principally because of the mechanical trouble connected with the use of such elements, they have been supplanted to a large extent by pressure-sensitive adhesive tapes. Nevertheless, such adhesive tapes also possess a number of drawbacks, e.g., they have a tendency to leave messy smudges on boards or other articles when they are removed; they have a tendency to "creep" when employed for holding sheets on vertical surfaces, so that messy adhesive areas are formed around them, and they often result in damage, either to the article held by them or the board or other surface on which they are applied when the article is removed.

One approach at obtaining a solution to some of the problems mentioned above, has been to use pressure-sensitive adhesive tapes or surfaces which possess less tackiness and aggressive adhesive properties than the rubber-base adhesive masses commonly employed in the preparation of pressure-sensitive adhesive tapes. Thus, the formation of pressure-sensitive adhesive tapes or other products using adhesive wax compositions, including microcrystalline wax, in order to form less aggressive adhesive products has been suggested in the prior art (for example, see U.S. 2,373,634, 2,444,443 and 2,741,564). The basic idea of using the adhesive waxes of reduced adhesive aggressiveness as compared with rubber-base adhesives, has also been applied in various ways to the formation of special adhesive mounting devices, such as the wax-coated adhesive wafers of U.S. Patents 2,658,-246 and 2,699,999, or the educational adhesive mounting boards or panels of U.S. 2,592,078.

In spite of these and other numerous developments in the field of fastening devices and pressure sensitive adhesives, there has existed for a long time, and still exists, a real need for improved devices on which paper, cards, or other sheet-like articles may be quickly and easily adhered to remain thereon temporarily, and from which the articles may be removed without destruction either to the article or the surface to which they had been mounted. Because of the inconvenience connected with the use of external means such as thumb tacks, adhesive tapes, adhesive wafers or the like, such improved devices should be self-contained, i.e., the adhesive areas which make possible the temporary mounting of paper or the like should constitute a permanent and integral part thereof. As a specific example of one device for which there has been a real and long need is a bulletin board upon which papers or other sheets can be mounted without requiring the use of thumb tacks or other external devices such as glues, cement, or adhesive tapes. Similar need exists for display panels, adhesive game or educational boards or the like, to which anything from thin paper to substantially heavier three-dimensional objects can be instantly secured or removed without the aid of pins, tacks, magnets, adhesive tapes, or other external fastening devices.

OBJECTS

A principal object of this invention is the provision of new adhesive devices and new processes for making them. Further objects include:

(1) The provision of display panels or boards or similar sheet-like devices which present a pressure-sensitive adhesive surface to which paper, or similar sheet-like articles, and even heavier three-dimensional objects may be instantly secured or mounted by simply pressing the article against the adhesive surface of the device, and from which the article, once mounted or secured, may be removed without damage thereto by simply pulling off the article.

(2) The provision of new display boards or panels or similar sheet-like devices to which paper, cards and even heavier three-dimensional objects can be instantly secured and removed without damage thereto, without the need to use pins, tacks, magnets or other external fastening devices.

(3) The provision of new forms of display boards which have a pressure-sensitive adhesive surface of such composition and construction that thin paper or the like may be temporarily secured or mounted on the board, and then removed without damage to the mounted article or to the display board, enabling the board to be continually used for the repetitive mounting of papers, cards or the like thereon.

(4) The provision of new processes for the production of display boards or like devices having a pressure-sensitive adhesive surface composed of non-drying adhesive wax layer which has a pebbled exterior.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention by the provision of adhesive devices which comprise a rigid base having an outer surface upon which a non-selfsupporting coating may be carried, and a non-selfsupporting coating of a non-drying adhesive wax on such outer surface, the exterior surface of said adhesive coating, being pebbled due to slight variations in the thickness of the adhesive coating, which are very numerous and irregularly distributed across said adhesive layer. Preferably, the rigid base for the new adhesive devices is some sheet-like element, such as a board, panel, or the like. Furthermore, the adhesive wax used in forming the pressure-sensitive adhesive surfaces for the new devices is, preferably, a soft grade microcrystalline wax.

The pebbled surface required for the new adhesive devices is obtained by spraying the non-drying adhesive wax onto the rigid base until a layer of adhesive wax of desired depth is obtained, preferably, between about 0.005 to 0.5 inch in thickness. It has been discovered that for best results, (1) the wax spraying should be accomplished by the use of a spray gun of the internal-mixing type, (2) low pressure and low volume of air should be used in carrying out the spraying, and (3) the air should be pre-heated, e.g., to a temperature between 300 to 500° F., before it is brought into contact with the wax in the spray gun.

If an absorbent type of material, e.g., cardboard, fiber board, plywood or similar cellulosic fiber sheets, is used as the base sheet for the new adhesive devices, a reduction of the adhesive qualities of the pressure-sensitive adhesive layer may take place as the device ages. It has been found that this reduction in adhesiveness can be eliminated if a relatively impervious, continuous primer coat is applied to the base sheet before the non-drying adhesive wax layer is formed thereon. This leads to the conclusion that reduction in adhesive qualities may be due to migration of certain components of the wax coating into the base, which leaves a less adhesive residue than was initially formed upon the rigid base.

The success of the present invention is due in part to the discovery that critically superior characteristics are created in the new adhesive devices if the wax coating is formed with a pebbled exterior created by slight variations in the thickness of the adhesive coating across the area of the coating, such as is formed by the indicated spray coating procedure. In contrast, a similar device having a coating which is smooth or which has been embossed or otherwise mechanically formed with some protuberances regularly distributed across the adhesive surface is not nearly as satisfactory for mounting paper articles or the like. It appears that this is due to the fact that the pebbled surface makes possible the formation of many small, localized pressure points between the adhesive surface and an article which is pressed against it so that more intimate contact at these points between the wax and the article is obtained. The pebbled surface is not destroyed through repeated use of the adhesive device, and, as a result, the improved adhesive qualities of the devices are retained throughout any normally expected life of the products.

The success of the invention is also due in part to the discovery that when a soft grade of microcrystalline wax is used to form the adhesive layer, a microscopically thin film of the wax is lifted off the board on the surface of each article as it is removed from the board. This might appear to be a serious short-coming, but it is actually an important key to the successful performance of the board. If the wax did not come off as a film on the article, paper or other soft materials would be damaged, i.e., they would delaminate and leave part of their surface clinging to the wax. In time, this build-up would impair the adhesiveness of the board or render it useless. This self renewing feature also helps to remove dust, perspiration oils, and other foreign matter that would normally collect on the surface from use and exposure to the air. Microcrystalline wax of a soft grade as hereinafter described has been found to give just the right amount of wax removal to produce the ideal pressure sensitive adhesive qualities.

DETAILED DESCRIPTION

A more complete understanding of the new devices and processes of this invention may be had by reference to the accompanying drawing in which:

Fig. 1 is a face view of a framed display board made in accordance with the invention;

Fig. 2 is an enlarged perspective view of one form of adhesive device of this invention; and Fig. 3 is an enlarged perspective view of a preferred form of adhesive device of this invention.

In Figs. 2 and 3, the various layers of which the adhesive devices are composed are not necessarily to scale, i.e., relative thickness between layers has been somewhat distorted for the sake of better illustration.

Referring in detail to the drawings, the display board 2 of Fig. 1 has a pressure-sensitive adhesive surface 4 protected at its edges by the surrounding frame 6. On the display board 2, sheets of paper 8 and a card 10 have been mounted in a manner which will be described more fully hereafter.

Referring to Fig. 2, the sheet-like adhesive device 12 comprises a rigid base sheet 14 and a pressure-sensitive adhesive layer 16 covering the entire one side of the base sheet 14. Stippling has been used to show that the top surface of the adhesive layer 16 is pebbled.

In Fig. 3, the preferred form of adhesive device 18 comprises a rigid base sheet 20, the top surface of which has been entirely covered by a primer coat 22. Over this primer coat there is the adhesive wax layer 24 which has a pebbled exterior represented by the stippling on the figure.

A wide variety of different materials may serve as the rigid base upon which the pressure-sensitive wax adhesive layer is supported. Although irregular shaped three-dimensional objects may be used, preferred devices of the invention have a base which is in the form of a flat sheet, panel or board. The most useful devices employ base sheets which are relatively uniform in thickness and have a thickness between about 1/64 to 1 inch.

Usable base sheets may be formed of a variety of materials, such as aluminum, enameled steel and other metals, ceramics, stiff leather, gypsum board, asbestos-cement board, various thermosetting and thermoplastic resins and the like. However, sheets composed of cellulosic fibers are preferred and examples of such desirable materials for base sheets include fiber board, cardboard, hard board, plywood, and similar construction sheets of cellulosic material.

The adhesive wax composition of which the pressure-sensitive adhesive surfaces of these new devices is formed should be non-drying and not subject to oxidation or deterioration upon exposure to air under temperature conditions normally encountered in the use of display boards or like devices. Although it is possible to form wax compositions meeting this description from various blends of vegetable, animal or insect waxes with plasticizers or solvents, it has been found that critically superior results are obtained if a soft grade of microcrystalline wax is employed in forming the wax layers of the new products. An example of the commercially available type of microcrystalline wax which can be used is Bareco Wax Company's "Ceratek," No. 165. This wax has a penetration (ASTM D5–25) at 77° F. 100 grams, of from 25/35. While this particular wax is ideal, other waxes with approximately the same softness will give more or less acceptable results. These include Bareco's "Victory" series, with the same softness rating, and the "Ceraweld" waxes, rated at 20/25 needle penetration.

Waxes that have a rating of as low as 20 appear to be too hard at normal room temperatures (70°–80°) for the easy application of articles to the coated board. The harder waxes also tend to tear papers which have been affixed to the wax, when they are peeled or stripped off.

On the other hand, waxes that are much softer than the 35 rating are equally unsuitable, as they do not hold articles well for prolonged periods, and on removal, excessive quantities of wax are pulled off the board and left adhering to the article removed.

The thickness of the pressure-sensitive wax surface layer may be varied, but most desirable results have been obtained using wax layers of a thickness between about 0.005 and 0.5 inch, preferably 0.01 to 0.2 inch.

By varying the flow, pressure and temperature of wax and air during spraying of the wax coatings, the pebbling of the surface can be closely controlled. Advantageously, the droplets forming the pebbling may be 0.01 to 0.2 inch at the base and standing about 0.01 to 0.1 inch high, so that variations between high and low points can reach ⅛ inch or more.

While it is possible to form the new adhesive devices simply with a rigid base on which the pressure-sensitive adhesive layer is directly coated, the preferred devices of the invention employ a primer coat or layer between the rigid base and the adhesive wax layer. The use of primer coats gives products having a number of improved properties, e.g., the prevention of change of adhesive qualities with fibrous base sheets, has been referred to above. Also, where a pigmented or dyed wax is being applied, a similarly colored primer coating of paint, lacquer, or stain, will increase the depth of color and uniformity of appearance in the wax coating with economy of wax and coloring added. A primer and binder coat is also advantageous where the surface to which the wax is sprayed is soft. Without such a coating, the surface of the board itself may be pulled away when securely affixed articles are removed from the wax.

A wide variety of coating materials may be used to form the indicated primer coats, but the material used should be capable of forming a continuous film which is impervious to wax and heavy hydrocarbon liquids. Commercially available enamels, lacquers and paints are recommended, although solutions of resinous materials such as polystyrene, polyethylene, polyvinyl chloride and the like in suitable solvents may be employed. For best results, the primer material should be applied to give a final layer of between about 0.001 and 0.05 inch in thickness.

It is essential that the wax coating be pebbled, or uneven, so that when articles are pressed to the surface, pressure points occur. On a smooth, or nearly smooth surface, the ease of securing articles to a wax surface within the softness limits outlined, is greatly reduced. The smooth surface also shows scratches and other disfiguring marks and dirt particles far more readily than the pebbled coating. Still another value of the sprayed coating is in the economy of wax. It is thus practical to use an intermittent coating in which the entire background is not coated, but has droplets of wax dispersed over the board with small areas immediately adjacent each droplet left uncoated.

The spray coating also permits easy adjustment of the thickness of coating as well as coarseness of the pebbling.

As previously indicated, the pebbled exterior for the adhesive wax layers is obtained by spraying the wax composition onto the unprimed or primed base sheet. It has been discovered that several special techniques should be used in forming the adhesive wax coatings of this invention by spraying, if the best obtainable devices are to be obtained. Thus, it has been found that a prime problem in spraying coatings of controlled thickness and uniformity is the tendency for the adhesive wax to be chilled during atomization, and in transit from the gun nozzle to the surface to which it is applied. This prevents good bonding, and usually results in large losses of wax in the form of spray dust.

Normally, this would be overcome by spraying the wax at a higher temperature, but the working temperatures are restricted by two considerations. If the wax is held at a high temperature, such as 350° F. or higher, for long periods of time, it will start oxidizing, and once this action is started, it will continue at room temperatures. The other consideration is that microcrystalline waxes break down chemically when highly heated.

A technique found to overcome these problems involves preheating the air supply to the spray gun with a small electric heating coil located at or near the air intake on the gun. The air may thus be heated to 300–500° F., as it will cool considerably from the expansion, upon being released to atmospheric pressure at the gun nozzle. By this procedure, the wax need only be heated a little above its melting point (155–165° F.) in the reservoir and feed line to the gun, since the air supply will actually superheat the wax at the moment of atomization and transmit it to the sprayed surface in a heated atmosphere.

It has also been found that critically superior adhesive wax coatings are obtained if the air pressure and air flow are held at a minimum. This prevents the wax from being broken into such small particles that the coating is too smooth, and eliminates excessive loss of wax due to failure of wax to impinge on the surface sprayed.

Because of the importance of low pressure and volume of air, the use of internal-mixing type spray guns have been found superior to the external-mixing type generally used for commercial spraying of paints and other liquids. Not only does the internal mixing gun operate on less air pressure and volume, but the wax is brought into contact with the air before it is released to the atmosphere. This gives the wax more time in which to pick up heat from the air, and by mixing with the air under pressure, the air loses none of its heat from expansion to the atmosphere until after the wax has been superheated. As the wax has a relatively high specific heat, this is advantageous.

The use of heated air supply also eliminates the need for a heating system in the spray gun, as the flow of hot air through a gun of the continuous bleeding type keeps the nozzle parts heated well above the melting temperature of the wax. In fact, the flow of superheated air in the gun, especially over the needle valve assembly, can serve as an intermediate heating stage for the wax as it feeds up through closely adjoining passages in the gun.

By applying the wax coating with spray methods, it is practical to modify or localize the coating with masks or screens. For example, a cut-off stencil may be placed over the surface to be sprayed so that the wax will only be applied to certain restricted areas. Thus, if the board has pictures of various characters, the stencil may have been cut to outline these pictures, and when in register with them, the balance of the board will be masked out, and be free of the coating. If it is desirable to have a border area which is non-adhesive, a masking frame placed against the board before spraying will prevent this portion of the surface from being coated. Smaller wax layer patterns may be formed. For example, if a sheet of wire screen is placed over the board before spraying, the resulting coat will be an all-over pattern of small squares of wax the size of the openings in the wire screen. It will be seen that by this technique repetitive or varied patterns of almost unlimited scope are possible, and that all of these still will present a pebbled exterior. By using colored wax, adhesive silhouettes and figures may be formed, or small or large patterns of geometric shapes.

In the commercial use of spray methods of applying material, an important consideration is the loss of material. A certain percentage of the spray inevitably misses the article being manufactured. With paints, lacquers, and the like, this "overspray" can amount to a considerable loss, due to the difficulty of reclaiming it. In the case of microcrystalline wax, however, this overspray is easily reclaimed and used. This is particularly true where the overspray is collected on metal sheets which may be heated. Even very heavy deposits of wax are quickly removed by simply heating the reverse side of the metal sheet until the contacting wax surface is molten. The entire cake of wax may then be lifted free. Other methods of reclaiming the wax are by warming the wax in some way such as hot air, or infrared light and then scraping off the softened wax with a tool, such as a putty knife. For intricate shapes, the wax may be completely melted off with a suitable heat source, such as the above, or by immersion in hot water.

As no chemical action, such as oxidation, occurs, in the hardening of the wax, nor are any solvents used, as with lacquers, the reclaimed wax is equal in every way to new wax.

*Example*

This example illustrates production of a bulletin board in accordance with this invention.

A sheet of fiber board 3 ft. by 4 ft., and ½ inch in thickness, and weighing about 13 oz. per square foot, is painted on one surface with two coats of a hard green colored enamel, such as "Kem Glo" enamel sold by the Sherwin-Williams Company. Each coat of the primer layer is applied by brush to the fiber board, and is allowed to air dry for two days before another coating is applied to the board.

After the primer layers have completely dried and hardened, a continuous coating of microcrystalline wax having a needle penetration value of 25/35 at 77° F. (ASTM D5-25 for 100 grams) is formed over the primer layer by spraying the microcrystalline wax from an internal-mixing type spray gun using approximately 5 lbs. of air pressure. The air is preheated prior to introduction into the internal mixing chamber of the gun to a temperature of 300 to 350° F. and the wax is held at a temperature of about 155 to 165° F. in the reservoir chamber of the gun. The spraying is conducted so that the primer coated sheet is covered all over with a wax layer which averages about 0.1 inch in thickness. The board is finished by enclosing it in a wood frame similar to the framing of a picture.

There is obtained a board which has a green pastel colored pressure-sensitive adhesive surface which presents a pebbled exterior. When the surface is touched with the fingers, it does not feel tacky, but has a somewhat waxy feel. Sheets of paper, cards, cardboard posters, or the like, however, are easily mounted upon the resulting board, even when it is hung in a vertical position, simply by bringing the paper, card or the like into contact with the wax layer and pressing the article with light pressure against the wax surface. Where extra large or extra heavy cardboard sheets or other three-dimensional objects are to be mounted on the board, increased pressure of application can be used to insure that sufficient points of adhesive bonding take place between the mounted article and the adhesive surface, to maintain the mounted article upon the board until it is desired to remove the article. Removal of an article is easily accomplished simply by grasping it at one corner, or in any other suitable manner, and pulling it from the surface of the display board.

In order to protect the surface of the display board against damage during transportation or during storage, it is desirable to cover the adhesive surface of the board with a thin sheet of nonfibrous material, such as a thin sheet of polyethylene or cellophane.

The term "display panel" as used herein means any board or panel-like device to a flat surface of which there may be adhered or mounted paper sheets, cards, cutout elements, or the like. Hence, the term includes bulletin boards, advertising signs, window display cards, adhesive game boards, and similar article holding or mounting boards.

CONCLUSIONS

There have been described above new adhesive devices, such as display panels, to which anything from thin paper to substantially heavier three-dimensional objects, e.g., buttons, keys, coins, thread and wire, etc., can be instantly secured or removed without need for the use of pins, tacks, magnets, adhesive tapes, or other external fastening devices. New devices can be made with single or varied colored pressure-sensitive adhesive surfaces, and where light colored wax is sprayed in light to medium thickness, boldly printed patterns or backgrounds are readily visible through the wax. This makes it possible to employ the basic concept of the new adhesive devices for such uses as adhesive game boards, or toys in which small figures or articles are temporarily mounted in various relations to one another and to the background. Game boards and toys so constructed are particularly suited for young children because their use does not subject the children to the dangers connected with their use of tacks, pastes, glues and the like. Furthermore, three-dimensional objects may be adhesively coated for such uses as assembly of take-apart toys, and other possible uses include small tool boards, surface boards for assembly of jigsaw puzzles, adhesive backed tracing patterns to prevent slippage while in use, and the like.

Special wax compositions formed in a special manner are used in the formation of the new adhesive devices, and a detailed description of the methods used in producing the adhesive devices has been given.

I claim:

1. A board having an adhesive surface to which flat-surfaced articles may be adhered by pressing an article against the adhesive surface with a light pressure and from which the article, once adhered, may be removed by pulling the article from said surface which comprises a rigid base having an outer surface, and an exteriorly disposed adhesive coating of a non-drying microcrystalline adhesive wax on and supported by said outer surface, said adhesive coating having slight variations in the thickness thereof irregularly distributed throughout said adhesive layer whereby an external pebbled surface is provided, said pebbled surface providing a plurality of localized adhesion points between said adhesive surface and a sheet-like article when the article is pressed against said non-drying adhesive wax surface.

2. A board as defined in claim 1 in which the microcrystalline wax has a needle penetration of about 20 to 35 when measured at 77° F.

3. A board as defined in claim 1 wherein a continuous relatively impermeable primer coating is interposed between said adhesive coating and said outer surface of said base.

References Cited in the file of this patent

UNITED STATES PATENTS

| | | |
|---|---|---|
| Re. 21,762 | Drew | Apr. 8, 1941 |
| 1,530,997 | Gjorup | Mar. 24, 1925 |
| 1,925,214 | Storm | Sept. 5, 1933 |
| 1,977,022 | Swift | Oct. 16, 1934 |
| 2,250,583 | Krauter | July 29, 1941 |
| 2,444,443 | Hesselroth | July 6, 1948 |
| 2,513,708 | Belcher | July 4, 1950 |
| 2,592,078 | Taylor et al. | Apr. 8, 1952 |
| 2,700,625 | Morris et al. | Jan. 25, 1955 |
| 2,730,477 | Kindt et al. | Jan. 10, 1956 |
| 2,775,048 | Berman | Dec. 25, 1956 |